US008266903B2

(12) United States Patent
Kowatari et al.

(10) Patent No.: US 8,266,903 B2
(45) Date of Patent: Sep. 18, 2012

(54) ENGINE LAG DOWN SUPPRESSING DEVICE OF CONSTRUCTION MACHINERY

(75) Inventors: Yoichi Kowatari, Ibaraki (JP); Yasushi Arai, Ibaraki (JP); Kouji Ishikawa, Ibaraki (JP); Kazunori Nakamura, Ibaraki (JP); Nobuei Ariga, Ibaraki (JP); Hideo Karasawa, Ibaraki (JP); Yuuki Gotou, Ibaraki (JP); Motoyuki Yabuuchi, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1242 days.

(21) Appl. No.: 10/569,490

(22) PCT Filed: Aug. 27, 2004

(86) PCT No.: PCT/JP2004/012759

§ 371 (c)(1), (2), (4) Date: May 16, 2008

(87) PCT Pub. No.: WO2005/021977

PCT Pub. Date: Mar. 10, 2005

(65) Prior Publication Data

US 2008/0236157 A1 Oct. 2, 2008

(30) Foreign Application Priority Data

Aug. 28, 2003 (JP) ................................ 2003-304532

(51) Int. Cl.
*F16D 31/02* (2006.01)

(52) U.S. Cl. ................................ 60/449; 60/434; 60/452

(58) Field of Classification Search .................... 60/431, 60/434, 449, 451, 452
See application file for complete search history.

(56) References Cited

FOREIGN PATENT DOCUMENTS

| | | | |
|---|---|---|---|
| JP | 2-146279 | A | 6/1990 |
| JP | 7-208344 | A | 8/1995 |
| JP | 2000-154803 | A | 6/2000 |
| JP | 2000-161302 | A | 6/2000 |

OTHER PUBLICATIONS

International Search Report dated Oct. 26. 2004 (four (4) pages) including English translation.

*Primary Examiner* — Michael Leslie
(74) *Attorney, Agent, or Firm* — Crowell & Moring LLP

(57) ABSTRACT

An engine lag down control system for construction machinery has a machinery body controller having first, second and third torque control units and a solenoid valve. The first torque control unit controls a torque control valve to a minimum pump torque corresponding to a target number of engine revolutions when a non-operated state of a control device has continued beyond a monitoring time. The second torque control unit controls the torque control valve such that the above-described minimum pump torque is held for a predetermined holding time subsequent to the operation of the control device from the non-operated state. The third torque control unit controls the torque control valve such that from a time point of a lapse of the predetermined holding time, the pump torque is gradually increased on a basis of a predetermined torque increment rate.

6 Claims, 12 Drawing Sheets

ENGINE LAG DOWN SUPPRESSING DEVICE OF CONSTRUCTION MACHINERY

TECHNICAL FIELD

This invention relates to an engine lag down control system for construction machinery, which is to be arranged on construction machinery such as a hydraulic excavator to control small a reduction in engine revolutions that temporarily occurs when a control device is operated from a non-operated state.

BACKGROUND ART

As a technique of this kind, an engine lag down control system has been proposed to date. This engine lag down control system is to be arranged on hydraulic construction machinery, which has an engine, a variable displacement hydraulic pump, i.e., main pump driven by the engine, a swash angle control actuator for controlling the swash angle of the main pump, a torque regulating means for regulating the maximum pump torque of the main pump, for example, a means for controlling the swash angle control actuator such that the above-described maximum pump torque is held constant irrespective of changes in the delivery pressure of the main pump, a solenoid valve for enabling to change the maximum pump torque, a hydraulic cylinder, i.e., hydraulic actuator operated by pressure fluid delivered from the main pump, and a control lever device, i.e., control device for controlling the hydraulic actuator.

The conventional engine lag down control system is constituted by a processing program stored in a controller and an input/output function and computing function of the controller, and includes a torque control means and another torque control means. When a non-operated state of the control device has continued beyond a predetermined monitoring time, the former torque control means outputs a control signal to the above-described solenoid valve to control a maximum pump torque, which corresponds to a target number of engine revolutions until that time, to a predetermined low pump torque. In the course of the control by the torque control means, the latter torque control means holds the above-described predetermined low pump torque for a predetermined holding time subsequent to the operation of the control device from the non-operated state.

According to this conventional technique, upon quick operation of the control device from the non-operated state, the maximum pump torque is held at the predetermined low pump torque until the holding time elapses. At the time of a lapse of the holding time, the maximum pump torque is immediately changed to a rated pump torque, that is, the maximum pump torque corresponding to the target number of revolutions of the engine. During the holding time, the maximum pump torque is controlled at the predetermined low pump torque to reduce the load on the engine. Therefore, an engine lag down is controlled, in other words, a momentary reduction in engine revolutions when a sudden load is applied to the engine is controlled relatively small, thereby realizing the prevention of adverse effects on working performance and operability, a deterioration of fuel economy, an increase in black smoke, and the like (for example, see JP-A-2000-154803, Paragraph Numbers 0013, and 0028 to 0053, and FIGS. 1 and 3).

DISCLOSURE OF THE INVENTION

According to the above-described conventional technique, during the predetermined holding time after the operation of the control device from its non-operated state, the maximum pump torque is controlled at the predetermined low so that the load on the engine is reduced and a reduction in the revolutions of the engine during that time can be controlled relatively small. Immediately after a lapse of the holding time, however, the maximum pump torque is controlled to produce a maximum pump torque corresponding to the target number of revolutions of the engine. It is, therefore, unavoidable that shortly after the engine has reached the target number of revolutions or before the engine reaches the target number of revolutions, an engine lag down occurs again although it is relatively small. For such circumstances, it has also been desired to control an engine lag down after a lapse of the holding time. It is to be noted that the occurrence of an engine lag down after a lapse of the above-described holding time tends to induce adverse effects on working performance and operability.

The present invention has been completed in view of the above-described actual circumstances, and its object is to provide an engine lag down control system for construction machinery, which can control small an engine lag down after a lapse of a predetermine holding time, during which the maximum pump torque is held at a low pump torque, upon operation of the control device from a non-operated state.

To achieve the above-descried object, the present invention is characterized in that in an engine lag down control system for construction machinery provided with an engine, a main pump driven by the engine, a torque regulating means for regulating a maximum pump torque of the main pump, a hydraulic actuator driven by pressure fluid delivered from the main pump, and a control device of controlling the hydraulic actuator, said engine lag down control system including a first torque control means for controlling the torque regulating means to a predetermined low pump torque lower than the maximum pump torque when a non-operated state of the control device has continued beyond a predetermined monitoring time, and a second torque control means for controlling the torque regulating means to the predetermined low pump torque or to a pump torque around the predetermined low pump torque for a predetermined holding time subsequent to an operation of the control device from the non-operated state while the torque regulating means is being controlled by the first torque control means, to control small a temporary reduction in engine revolutions that occurs upon operation of the control device from the non-operated state, the engine lag down control system is provided with a third torque control means for controlling the torque regulating means such that from a time point of a lapse of the predetermined holding time, the pump torque of the main pump gradually increases at a predetermined torque increment rate as time goes on.

According to the present invention constructed as described above, the pump torque is gradually increased based on the predetermined torque increment rate by the third torque control means after a lapse of the predetermined holding time of the low pump torque upon changing of the control device from the non-operated state to the operated state. As a result, the load on the engine does not become a large load at once after the lapse of the above-described predetermined holding time, in other words, the load on the engine gradually increases, thereby making it possible to control small an engine lag down after a lapse of the predetermined holding time.

This invention may also be characterized in that in the above-described invention, the third torque control means can comprise a means for controlling the torque increment rate to be held constant during a change from the predetermined low pump torque to a maximum pump torque corresponding to a target number of revolutions of the engine.

This invention may also be characterized in that in the above-described invention, the third torque control means can comprise a means for variably controlling the torque increment torque during a change from the predetermined low pump torque to a maximum pump torque corresponding to a target number of revolutions of the engine.

This invention may also be characterized in that in the above-described invention, the means for variably controlling the torque increment rate can comprise a means for sequentially computing the torque increment rate for every unit time.

This invention may also be characterized in that in the above-described invention, the engine lag down control system is provided with a speed sensing control means having a corrected torque computing unit, which determines a torque correction value corresponding to a revolution deviation of an actual number of revolutions of the engine from a target number of revolutions of the engine, for determining a target value for the maximum pump torque, which is controlled by the first torque control means, on a basis of the torque correction value determined by the corrected torque computing unit; and the third torque control means comprises a function setting unit for setting beforehand a functional relation between torque correction values and torque increment rates, and a means for computing a torque increment rate from the torque correction value determined by the corrected torque computing unit of the speed sensing control means and the functional relation set by the function setting unit.

In the invention constructed as described above, an engine lag down subsequent to a lapse of the predetermined holding time for the low pump torque can be controlled small in the system that performs speed sensing control.

This invention may also be characterized in that in the above-described invention, the engine lag down control system is provided with a boost pressure sensor for detecting a boost pressure, and the third torque control means comprises a torque increment rate correction means for correcting the torque increment rate in accordance with the boost pressure detected by the boost pressure sensor.

As the present invention is designed to gradually increase the pump torque by the third torque control means subsequent to a lapse of the predetermined holding time, during which the pump torque is held at the low pump torque, upon operation of the control device from the non-operated state, a load applied to the engine can be reduced even after the lapse of the predetermined holding time. As a consequence, an engine lag down subsequent to the lapse of the predetermined holding time can also be controlled small compared the conventional technique, thereby making it possible to shorten the time required to reach the maximum pump torque corresponding to the target number of revolutions of the engine. In addition, it is also possible to assure a large pump torque in an early stage subsequent to the lapse of the predetermined holding time, and hence, to improve the working performance and operability over the conventional technique.

BRIEF DESCRIPTION OF THE DRAWINGS

FIG. 2 is a diagram showing pump delivery pressure-displacement characteristics (which correspond to P-Q characteristics) and pump delivery pressure-pump torque characteristics among basic characteristics which the construction machinery illustrated in FIG. 1 is equipped with.

FIG. 3 is a diagram showing P-Q curve shift characteristics among the basic characteristics which the construction machinery illustrated in FIG. 1 is equipped with.

FIG. 4 is a diagram showing engine target revolutions-torque characteristics among the basic characteristics which the construction machinery illustrated in FIG. 1 is equipped with.

FIG. 5 is a diagram showing position control characteristics among the basic characteristics which the construction machinery illustrated in FIG. 1 is equipped with.

FIG. 6 is a diagram showing engine control characteristics which the construction machinery illustrated in FIG. 1 is equipped with.

FIG. 8 is a block diagram showing a speed sensing control means which the machinery body controller included in the first embodiment of the present invention is equipped with.

BEST MODES FOR CARRYING OUT THE INVENTION

Best modes for carrying out the engine lag down control system according to the present invention for construction machinery will hereinafter be described based on the drawings.

Figure 1:
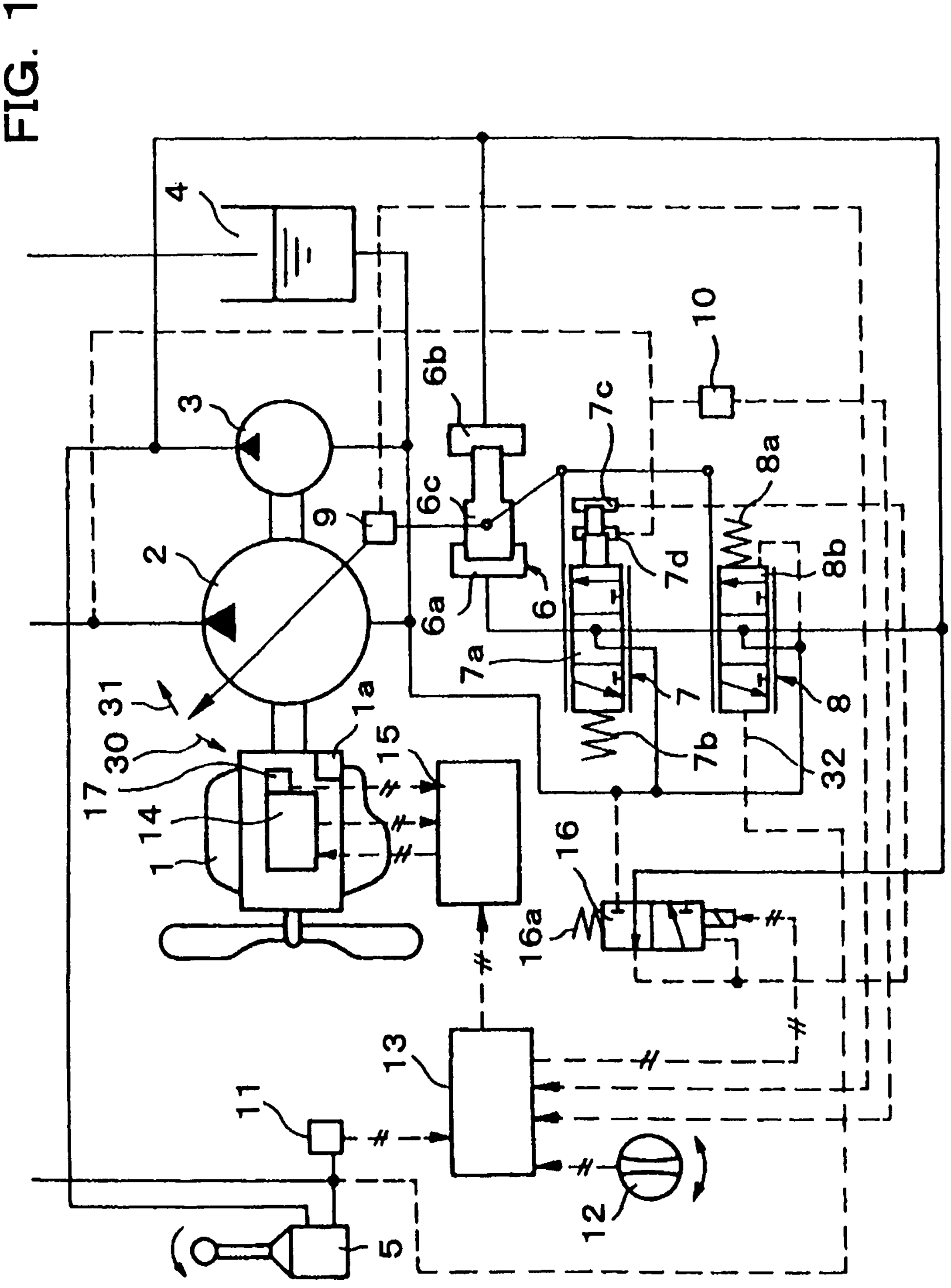
FIG. 1 is a diagram illustrating essential elements of construction machinery provided with an engine lag down control system according to the present invention.

FIG. 1 diagrammatically illustrates the essential elements of the construction machinery provided with the engine lag down control system according to the present invention. The first embodiment of the engine lag down control system according to the present invention is to be arranged on construction machinery, for example, a hydraulic excavator. This hydraulic excavator is equipped, as essential elements, with an engine 1, a main pump 2 driven by the engine 1, for example, a variable displacement hydraulic pump, a pilot pump 3, and a reservoir 4.

Also equipped are an unillustrated hydraulic actuator, such as a boom cylinder or arm cylinder, driven by pressure fluid delivered from the main pump 2, a control device 5 for controlling the hydraulic actuator, a swash angle control actuator 6 for controlling the swash angle of the main pump 2, and a torque regulating means for regulating the maximum pump torque of the main pump 2.

This torque regulating means includes a torque control valve 7 for controlling the swash angle control actuator 6 such that the maximum pump torque is held constant irrespective of changes in the delivery pressure of the main pump 2 and a position control valve 8 for regulating the maximum pump torque in accordance with a stroke of the control device 5.

Further equipped are a swash angle sensor 9 for detecting the swash angle of the main pump 2, a delivery pressure detecting means for detecting the delivery pressure of the main pump 2, specifically a delivery pressure sensor 10, a pilot pressure detecting means for detecting a pilot pressure outputted as a result of an operation of the control device 5, specifically a pilot pressure sensor 11, and a revolution instructing device 12 for instructing a target number of revolutions of the engine 1.

Still further equipped are a machinery body controller 13 and an engine controller 15. The machinery body controller receives signals from the above-described sensors 9-11 and revolution instructing device 12, has a storage function and a computing function including logical decisions, and outputs a control signal commensurate with the result of a computation. Responsive to the control signal outputted from the machinery body controller 13, the engine controller outputs a signal to control a fuel injection pump 14 of the engine 1. Also arranged around the fuel injection pump 14 are a boost pressure sensor 17 for detecting a boost pressure and outputting a detection signal to the engine controller 15 and a revolution sensor 1*a* for detecting an actual number of revolutions of the engine 1.

Yet further equipped with a solenoid valve 16, which operates responsive to the control signal outputted from the machinery body controller 13 and actuates a spool 7*a* of the above-described torque control valve 7 against the force of a spring 7*b*.

Figure 2A:
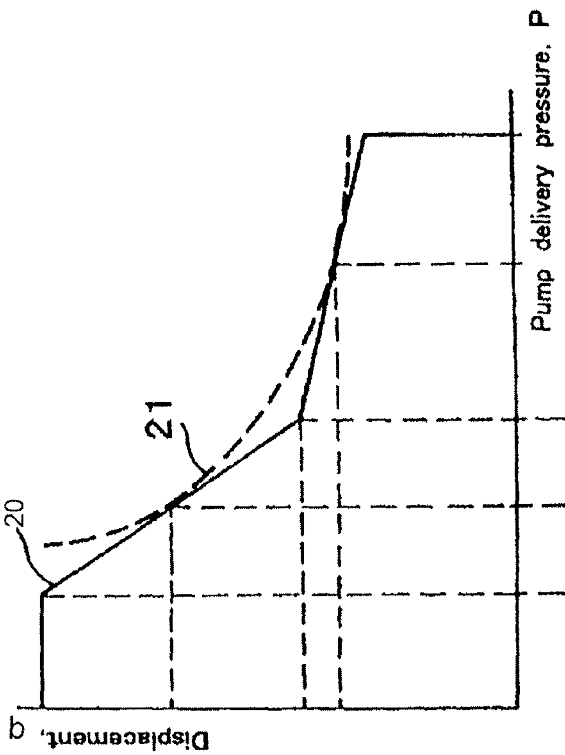
Figure 2B:
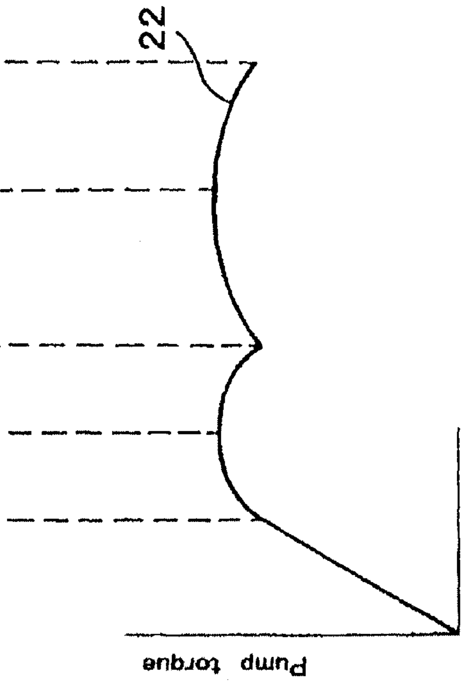
Figure 3:
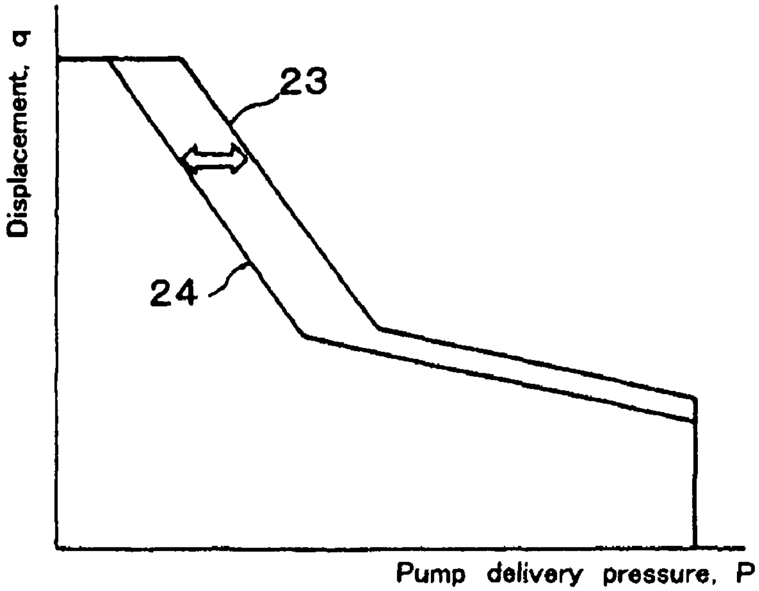
Figure 4:
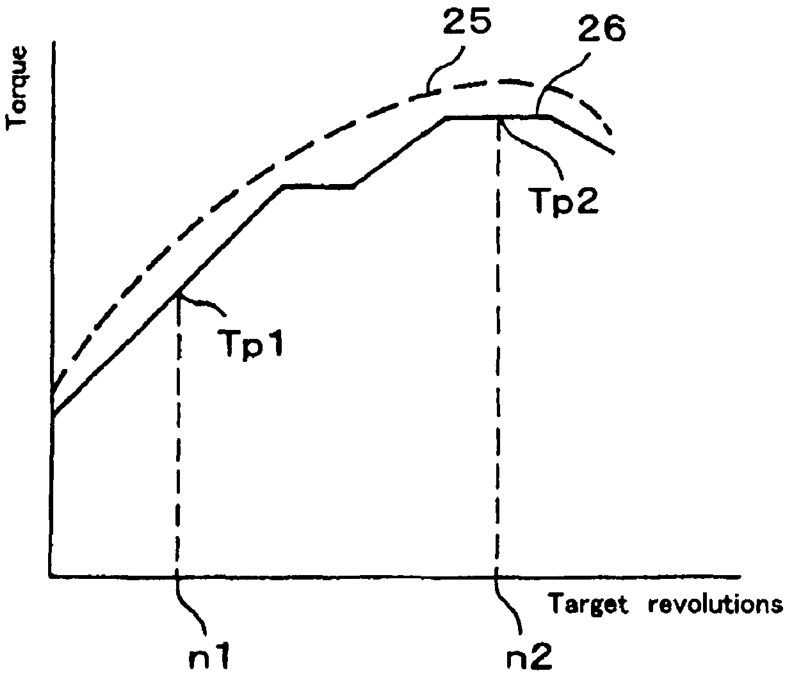
Figure 5:
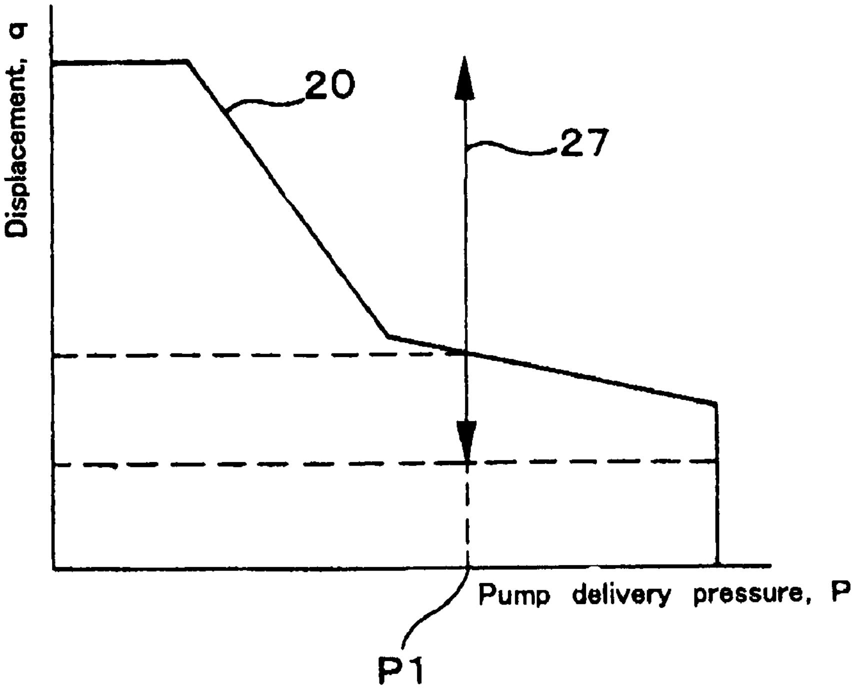

FIGS. 2 through 5 diagrammatically illustrate basic characteristics which the construction machinery, i.e., the hydraulic excavator shown in FIG. 1 is equipped with. FIG. 2 diagrammatically illustrates pump delivery pressure-displacement characteristics (which corresponds to P-Q characteristics), and pump delivery pressure-pump torque characteristics, FIG. 3 diagrammatically depicts pump delivery pressure-pump torque characteristics, FIG. 4 diagrammatically shows target engine revolutions-torque characteristics, and FIG. 5 diagrammatically illustrates position control characteristics.

As basic characteristics which the hydraulic excavator is equipped with, the hydraulic excavator has characteristics indicated by a P-Q curve 20, which are a relation between pump delivery pressures P and displacements q as shown in FIG. 2(*a*), in other words, a relation between pump delivery pressures P and delivery flow rates Q corresponding to displacements q. This P-Q curve 20 is commensurate with a constant pump torque curve 21. As illustrated in FIG. 2(*b*), the hydraulic excavator also has further characteristics, which are indicated by a pump torque curve 22 under P-Q control and are a relation between pump delivery pressures P and pump torques.

It is to be noted that the following relation is known to exist:

$$Tp=(p\times q)/(628\times\times\eta m) \quad (1)$$

where p and q represent a delivery pressure and displacement of the main pump 2, respectively, as mentioned above, Tp represents a pump torque, and ηm represents a mechanical efficiency.

As still further basic characteristics which the hydraulic excavator is equipped with, the hydraulic excavator also has the P-Q curve shift characteristics as shown in FIG. 3. In FIG. 3, numeral 23 indicates a P-Q curve commensurate with a maximum pump torque based on the target number of engine revolutions, and numeral 24 designates a P-Q curve commensurate with a pump torque under low torque control, said pump torque being lower than the above-described maximum pump torque, for example, a minimum pump torque (value: Min) to be described subsequently herein. By performing torque control processing as will be described subsequently herein, the P-Q characteristics can shift between the P-Q curve 23 commensurate with the maximum pump torque corresponding to the standard target number of revolutions of the engine 1 and the P-Q curve 24 commensurate with the minimum pump torque.

As still further basic characteristics which the hydraulic excavator is equipped with, the hydraulic excavator also has characteristics of a maximum engine torque curve 25 as indicated by a relation between target numbers of revolutions of the engine 1 and torques as shown in FIG. 4, and characteristics of a maximum pump torque curve 26 controlled not to exceed this maximum engine torque curve 25. The maximum pump torque takes a minimum value Tp1 on the maximum pump torque curve 26 when the target number of revolutions of the engine 1 are relatively small, i.e., n1, and becomes a maximum value Tp2 on the maximum pump torque curve 26 when the target number of revolutions of the engine 1 increases to target revolutions n2 commensurate with the rated revolutions.

When the maximum pump torque takes the maximum value Tp2 on the maximum pump torque curve 26 shown in FIG. 4, the P-Q curve becomes the same as the P-Q curve 23 in FIG. 3. When the maximum pump torque takes the minimum value Tp1 on the maximum pump torque curve 26 shown in FIG. 4, on the other hand, the P-Q curve becomes, for example, the same as the P-Q curve 24 in FIG. 3.

As still further basic characteristics which the hydraulic excavator is equipped with, the hydraulic excavator also has the position control characteristics which are illustrated in FIG. 5 and are available from the actuation of the position control valve 8 as a result of an operation of the control device 5. In FIG. 5, a position control line 27 when the delivery pressure P of the main pump 2 is P1 is shown.

As the position control valve 8 and the torque control valve 7 are connected together in tandem as depicted in FIG. 1, the maximum pump torque in this hydraulic excavator is controlled in accordance with the minimum value of the P-Q curve 20 and the position control line 27 in FIG. 5 when the pump delivery pressure P is P1.

Figure 6:
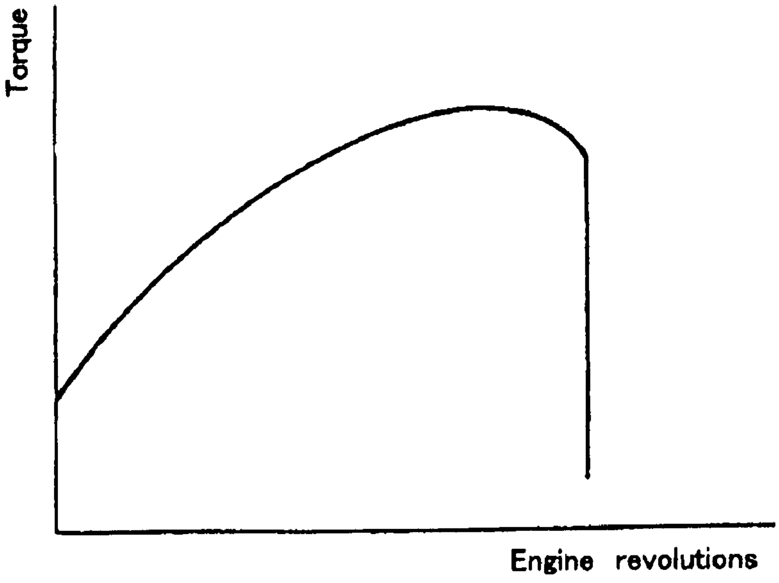
Figure 7:
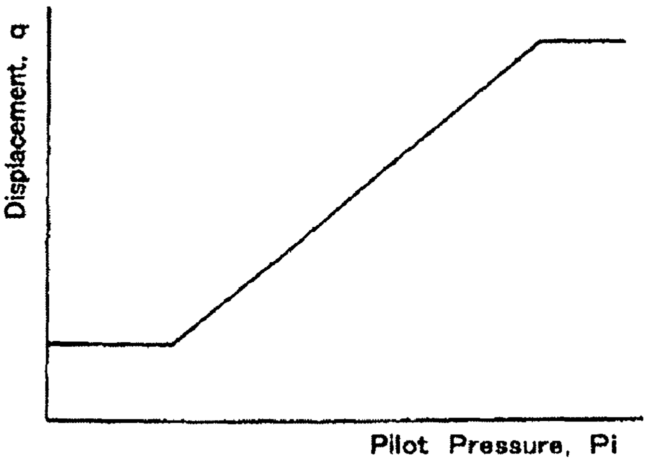
FIG. 7 is a diagram showing pilot pressure-displacement characteristics stored in a machinery body controller included in a first embodiment of the engine lag down control system according to the present invention.

FIG. 6 diagrammatically illustrates engine control characteristics which the construction machinery, i.e., hydraulic excavator shown in FIG. 1 is equipped with, and FIG. 7 diagrammatically shows pilot pressure-displacement characteristics stored in the machinery body controller.

As illustrated in FIG. 6, this hydraulic excavator has, as engine control characteristics, isochronous characteristics which are realized, for example, by electronic governor control.

In the above-described machinery body controller 13, a relation between pilot pressures Pi commensurate with strokes of the control device and displacements q of the main pump 2 is also stored as illustrated in FIG. 7. According to this relation, the displacement q of the main pump 2 gradually increases as the pilot pressure Pi becomes higher.

Figure 8:
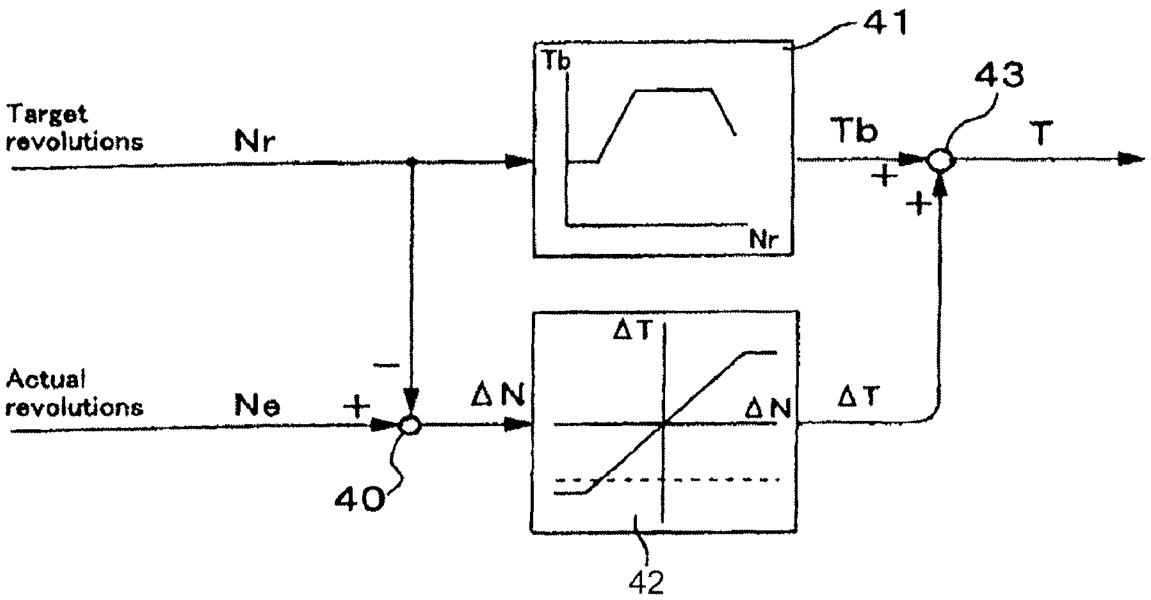

In the machinery body controller 13, a speed sensing control means depicted in FIG. 8 is also included. As depicted in FIG. 8, the speed sensing control means comprises a subtraction unit 40 for determining a revolution deviation ΔN of actual revolutions Ne of the engine 1 from target revolutions Nr of the engine 1, the above-described maximum pump torque curve shown in FIG. 4, namely, a force-power control torque computing unit 41 for setting the maximum pump torque curve which is a relation between target numbers Nr of revolutions and drive control torques Tb, a corrected torque computing unit 42 for determining a speed sensing torque ΔT corresponding to the revolution deviation ΔN outputted from the subtraction unit 40, and an addition unit 43 for adding a force-power control torque Tb outputted from the above-described force-power control torque computing unit 41 and the speed sensing torque ΔT together. From the speed sensing control means, a target value T of maximum pump torque as determined at the addition unit 43 is outputted to the control portion of the above-described solenoid valve 16 shown in FIG. 1.

In particular, this first embodiment is equipped with a third torque control means for controlling the above-described torque regulating means, which includes the torque control valve 7 and the position control valve 8, such that from the time point of a lapse of a predetermined holding time TX2 during which the maximum pump torque is held at the above-described predetermined low pump torque, the pump torque is gradually increased based on the predetermined torque increment rate K. This third torque control means is composed, for example, of the machinery body controller 13, the solenoid valve 16, and the like.

Among the above-described individual elements, the machinery body controller 13, the solenoid valve 16 and a pressure receiving chamber 7*c*, which is arranged in the torque control valve 7 on a side opposite the spring 7*b* and to which pressure fluid fed from the solenoid valve 16 is guided, make up the first embodiment of the engine lag down control system according to the present invention that controls a significant reduction in engine revolutions which momentarily occurs upon operation of the control device 5 from its non-operated state.

Further, the above-described machinery body controller 13, the solenoid valve 16 and the pressure receiving chamber 7*c* of the torque control valve 7 make up a first torque control means and a second torque control means. When the non-operated state of the control device 5 has continued beyond a predetermined monitoring time TX1, the first torque control means causes the spool 7*a* of the torque control valve 7 to move such that instead of a maximum pump torque corresponding to a target number of revolutions of the engine 1, the maximum pump torque is controlled at a predetermined low pump torque lower than the maximum pump torque, for example, a predetermined minimum pump torque (value: Min) is set. The second torque control means, on the other hand, holds the spool 7*a* of the torque control valve 7 such that the maximum pump torque is controlled, for example, at the above-described minimum pump torque during the predetermined holding time TX2 subsequent to the operation of the control device 5 from the above-described non-operated state while the maximum pump torque is being controlled by the first torque control means.

Figure 10:
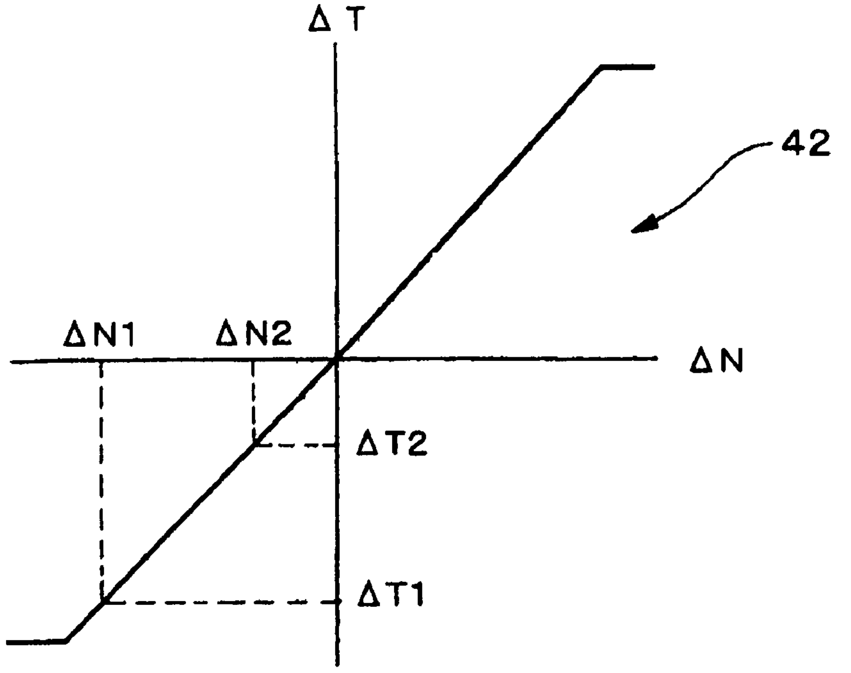
FIG. 10 is a diagram showing a corrected torque computing unit included in the speed sensing control means depicted in FIG. 8.
Figure 11:
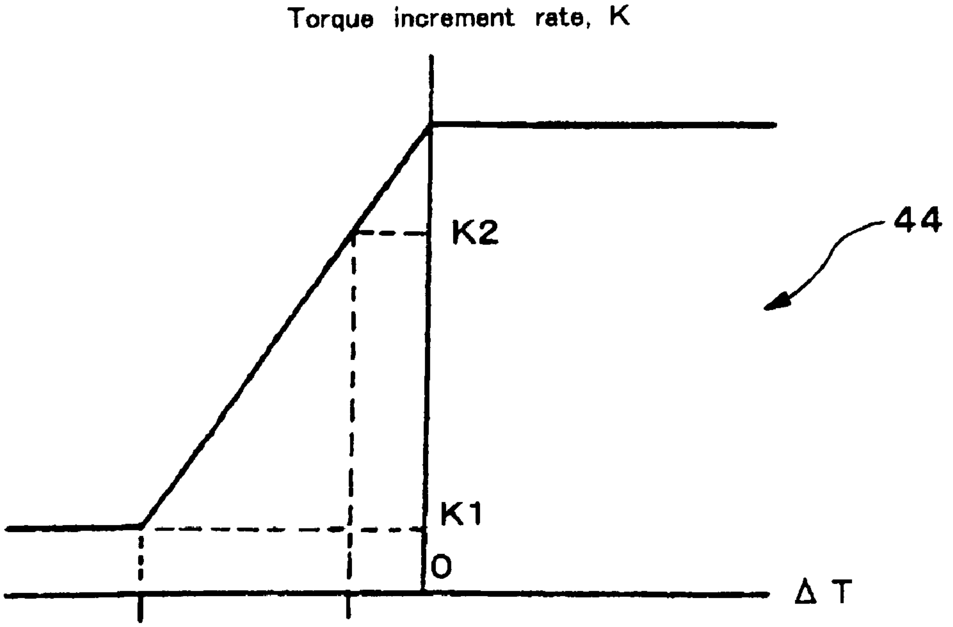
FIG. 11 is a diagram showing a function setting unit stored in the machinery body controller included in the first embodiment of the present invention.

FIG. 10 diagrammatically illustrates a corrected torque computing unit included in the speed sensing control means shown in FIG. 8, and FIG. 11 diagrammatically depicts a function setting unit stored in the above-described machinery body controller included in the first embodiment.

As illustrated in FIG. 10, at the corrected torque computing unit 42, a small speed sensing torque ΔT1 is obtained as a speed sensing torque ΔT when the revolution deviation ΔN is a small revolution deviation ΔN1, and a speed sensing torque ΔT2 greater than the speed sensing torque ΔT1 is obtained as a speed sensing torque ΔT when the revolution deviation ΔN is a revolution deviation ΔN2 greater than the revolution deviation ΔN1.

In the function setting unit 44 depicted in FIG. 11, a relation between speed sensing torques ΔT and torque increment rates K is set, for example, a linear relation is set such that the torque increment rate K gradually increases as the speed sensing torque ΔT becomes greater.

As shown in FIG. 11, the torque increment rate K, as the amount of a torque variation per unit time, takes a small value, specifically is a torque increment rate K1 when the speed sensing torque ΔT is the small speed sensing torque ΔT1 at the function setting unit 44 stored in the machinery body controller 13, but the torque increment rate K increases to K2, a value greater than K1, when the speed sensing torque ΔT is ΔT2 greater than ΔT1.

The machinery body controller 13 which constitutes the above-described third torque means also includes a means for controlling the torque increment rate K constant based on the functional relation of the function setting unit 44, which is illustrated in FIG. 11, during a change from the predetermined low pump torque to the maximum pump torque corresponding to the target revolutions of the engine 1.

The machinery body controller 13 which constitutes the third torque means further includes a means for computing a torque increment rate K from a torque correction value, i.e., a speed sensing torque ΔT determined at the corrected torque computing unit 42 shown in FIG. 10 and the relation between the speed sensing torque ΔT and its corresponding torque increment rate K as set at the function setting unit 44 depicted in FIG. 11.

Figure 9:
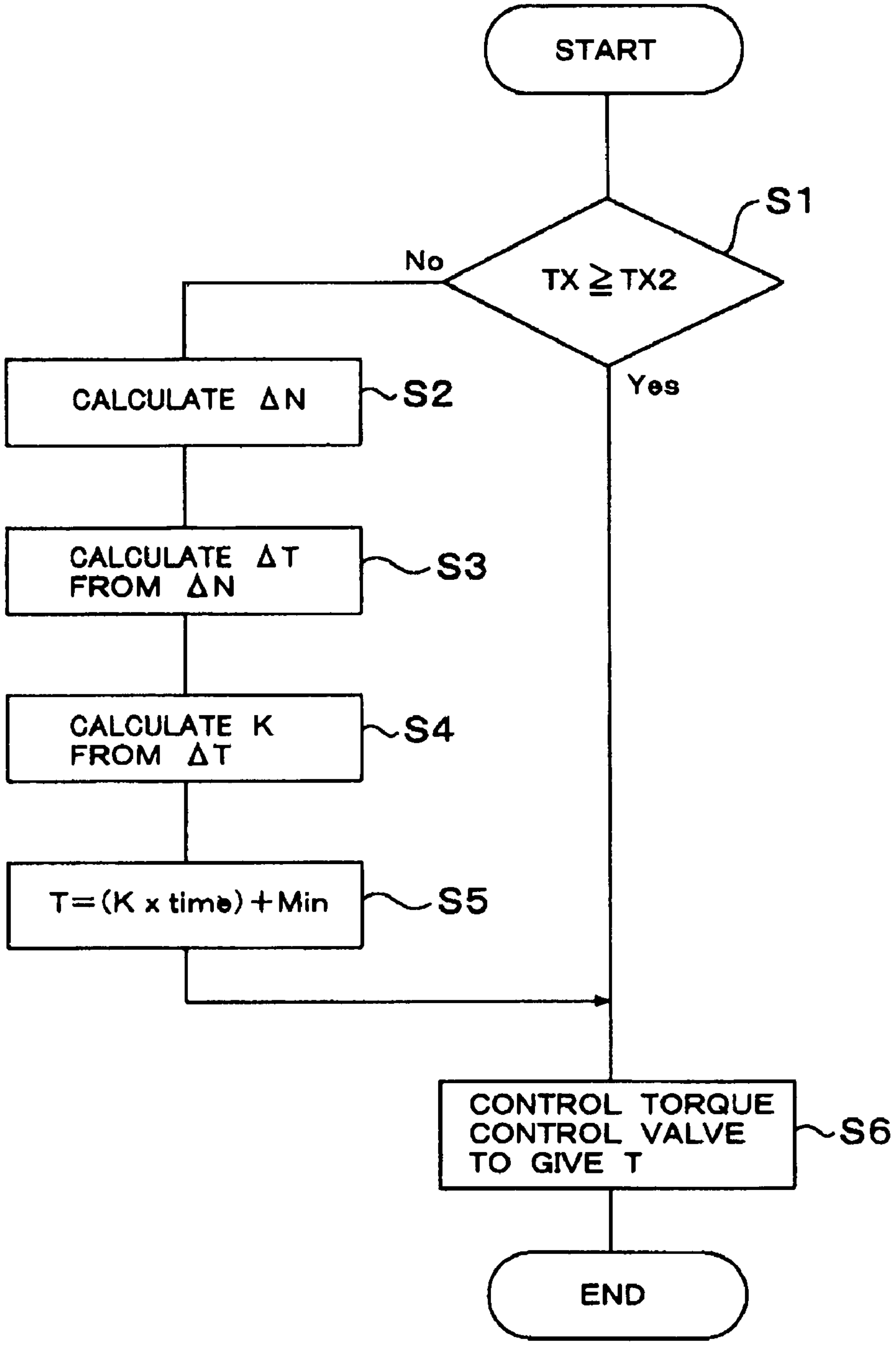
FIG. 9 is a flow chart showing a processing procedure at the machinery body controller included in the first embodiment of the present invention.

FIG. 9 is a flow chart showing a processing procedure at the machinery body controller included in the first embodiment. Following the flow chart shown in FIG. 9, a description will be made about a processing operation in the first embodiment of the present invention.

As shown in step S1 of FIG. 9, the machinery body controller 13 firstly determines whether or not a holding time TX, during which the control device 5 is held in a non-operated state, has continued beyond the predetermined holding time TX2. If determined to be "YES", the holding time TX has not reached the predetermined holding time TX2, and the torque control valve 7 is controlled such that the maximum pump torque T is held at the above-described low pump torque, specifically the minimum pump torque (value: Min).

When the control device 5 is in an operated state, on the other hand, and when force produced by the pressure of pressure fluid fed to a pressure receiving chamber 6*a* of the swash angle control actuator 6 shown in FIG. 1 via the torque control valve 7 and position control valve 8 is greater than force produced by a pilot pressure fed from the pilot pump 3 to the pressure receiving chamber 6*b*, a spool 6*c* moves in a rightward direction in FIG. 1 so that the swash angle of the main pump 2 decreases as indicated by a narrow 30. When the force produced by a pressure in the pressure receiving chamber 6*b* is conversely greater than the force produced by a pressure in the pressure receiving chamber 6*a*, the spool 6*c* moves in a leftward direction of FIG. 1 so that the swash angle of the main pump 2 increases as indicated by an arrow 31.

When the resultant force of force produced by a delivery pressure P fed from the main pump 2, for example, to a pressure receiving chamber 7*d* and force produced by a pilot pressure applied to the pressure receiving chamber 7*c* via the solenoid valve 16 becomes greater than the force of the spring 7*b*, the spool 7*a* moves in the leftward direction of FIG. 1 so that the torque control valve 7 tends to feed pressure fluid to the pressure receiving chamber 6*a* of the swash angle control actuator 6, in other words, tends to decrease the swash angle of the main pump 2. When the resultant force of force produced by a pressure applied to the pressure receiving chamber 7*d* and force produced by a pressure applied to the pressure receiving chamber 7*c* conversely becomes smaller than the force of the spring 7*b*, the spool 7*a* moves in the rightward direction of FIG. 1 so that the torque control valve 7 tends to return pressure fluid from the pressure receiving chamber 6*a* of the swash angle control actuator 6 to the reservoir 4, in other words, tends to increase the swash angle of the main pump 2.

In this case, the solenoid valve 16 tends to be switched toward the lower position of FIG. 1 against the force of a spring 16*a* by a control signal outputted from the machinery body controller 13, and therefore, the pressure receiving chamber 7*c* of the torque control valve 7 tends to be brought into communication with the reservoir 4 via the solenoid valve 16. Accordingly, the spool 7*a* of the torque control valve 7 moves depending on the difference between the force produced by the delivery pressure P fed from the main pump 2 to the pressure receiving chamber 7*d* and the force of the spring 7*b*.

When force produced by a pilot pressure guided via a pilot line 32 as a result of an operation of the control device 5 becomes greater than the force of a spring 8*a*, a spool 8*b* moves in a rightward direction of FIG. 1 so that the position control valve 8 tends to return pressure fluid from the pressure receiving chamber 6*a* of the swash angle control actuator 6 to the reservoir 4, in other words, tends to increase the swash angle of the main pump 2. When force produced by a pilot pressure guided via the pilot line 32 conversely becomes smaller than the force of the spring 8*a*, the spool 8*b* moves in a leftward direction of FIG. 1 so that the position control valve 8 tends to feed pressure fluid from the pilot pump 3 to the pressure receiving chamber 6*a* of the swash angle control actuator 6, in other words, tends to decrease the swash angle of the main pump 2.

Owing to such effects, the main pump 2 is controlled to a swash angle, in other words, a displacement q corresponding to a delivery pressure P of the main pump 2, and the pump torque of the main pump 2 is controlled to give a maximum pump torque Tp which is determined in accordance with the above-described formula (I). The P-Q curve at this time becomes the same as the P-Q curve 23 in FIG. 3 as mentioned above.

When the control device 5 became no longer operated and the monitoring time TX1 has been clocked, processing is performed to set the pump torque at the low pump torque commensurate with the P-Q curve 24 in FIG. 3, in other words, at the minimum pump torque. At this time, the machinery body controller 13 which makes up the first torque control means outputs a control signal to switch the solenoid valve 11.

As a result, the solenoid valve 16 tends to be switched by the force of the spring 16*a* toward the upper position shown in FIG. 1, a pilot pressure is fed to the pressure receiving chamber 7*c* of the torque control valve 7 via the solenoid valve 16, and the resultant force of force produced by a pressure in the pressure receiving chamber 7*d* and force produced by a pressure in the pressure receiving chamber 7*c* becomes greater than the force of the spring 7*d* of the torque control means 7 so that the spool 7*a* moves in the leftward direction of FIG. 1. Via this torque control valve 7, a pilot pressure is fed to the pressure receiving chamber 6*a* of the swash angle actuator 6, force produced by a pressure in the pressure receiving chamber 6*a* becomes greater than force produced by a pressure in the pressure receiving chamber 6*b*, the spool 6*c* of the swash angle control actuator 6 moves in the rightward direction of FIG. 1, and the swash angle of the main pump 2 changes in the direction of the arrow 30 to the minimum. At this time, the pump torque Tp becomes minimum as evident from the above-described formula (I). The P-Q curve at this time changes to the P-Q curve 24 in FIG. 3 as mentioned above.

When an unillustrated hydraulic actuator is, for example, quickly operated from the state that the pump torque is held at the minimum pump torque (value: Min) as mentioned above, control is performed by the second torque control means, which is included in the machinery body controller 13, to maintain the above-described low pump torque, i.e., the minimum pump torque during the predetermined holding time TX2.

When the predetermined holding time TX2 has elapsed from such a state and the above-described determination in step S1 shown in FIG. 9 results in "NO", processing with the control of the third torque control means taken into consideration is performed in the basic control by the speed sensing control means included in the machinery body controller 13.

About speed sensing control which is performed in general, a description will next be made.

Based on a signal inputted from the target revolution instructing device 12, the machinery body controller 13 performs a computation to determine target revolutions Nr of the engine 1. In addition, based on a signal inputted from the revolution sensor 1*a* via the engine controller 15, a computation is performed to determine a drive control torque Tb corresponding to the target revolutions Nr of the engine 1. Further, a revolution deviation ΔN of the above-described actual revolutions Ne from the above-described target revolutions Nr is determined at the subtraction unit 40, and a computation is performed at the corrected torque computing unit 42 to determine a speed sensing torque ΔT which corresponds to the revolution deviation ΔN.

The processing for determining the revolution deviation ΔN in step S2 of FIG. 9 and the processing for determining ΔT from the revolution deviation ΔN in step S3 of FIG. 9 are performed as mentioned above.

In the general speed sensing control, the speed sensing torque ΔT determined at the corrected torque computing unit 42 is added, at the addition unit 43, to the drive control torque Tq determined at the drive control torque computing unit 41, so that a computation is performed to determine a target value T of the maximum pump torque. A control signal commensurate with the target value T is outputted to the control portion of the solenoid valve 16.

According to the first embodiment of the present invention, on the other hand, a computation is performed to determine a torque increment rate K from the speed sensing torque ΔT determined at the corrected torque computing unit 42 as shown in step S4 of FIG. 9. Now assuming that the revolution deviation ΔN of the engine 1 as determined at the subtraction unit 40 in FIG. 8 is ΔN1 shown in FIG. 10 and the speed sensing torque ΔT determined at the corrected torque computing unit 42 is ΔT1 shown in FIG. 10, the torque increment rate K is determined to be relatively small K1 from the relation of the function setting unit 44 illustrated in FIG. 11.

As shown in step S5 of FIG. 9, the following computation:

$$T=\{(K=K1)\times\text{time}\}+\text{Min} \quad (2)$$

is performed, and a control signal corresponding to this target value T is outputted form the machinery body controller 13 to the control portion of the solenoid 16. The above-described "time" means a time subsequent to a lapse of the predetermined holding time TX2. On the other hand, the above-described "Min" means a predetermined low pump torque, namely, the value of a minimum pump torque held during the predetermined holding time TX2. In this first embodiment, the pump torque is not controlled such that as in the genera speed sensing control, the pump torque immediately increases to the maximum pump torque corresponding to the target revolutions Nr subsequent to a lapse of the predetermined holding time TX2, but relying upon the torque increment rate K (=K1), control is performed to gradually increase the pump torque as time goes on.

Figure 12A:
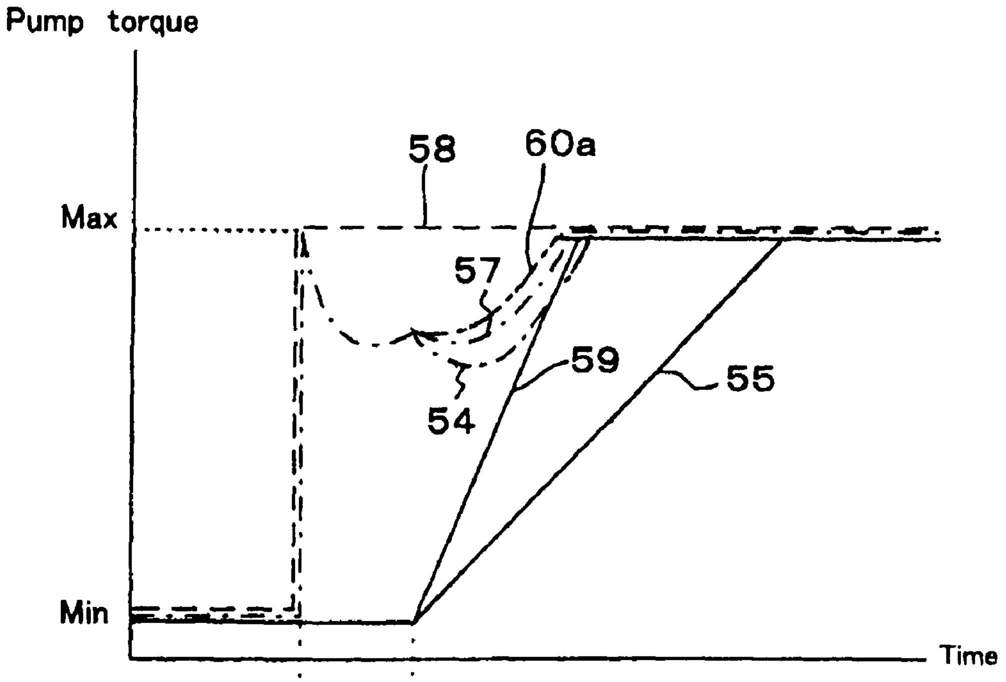
FIG. 12 is a diagram showing time-engine revolutions characteristics, time-maximum pump torque characteristics and time-engine revolutions characteristics, which are available from the first embodiment of the present invention.
Figure 12B:
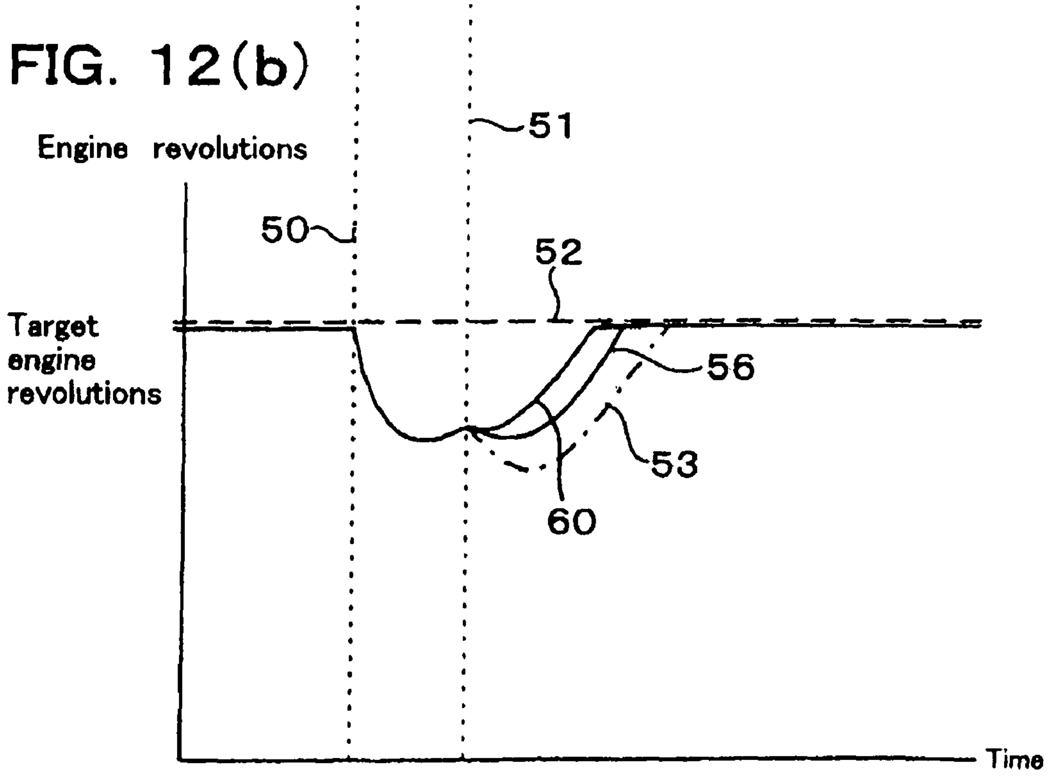

FIG. 12 diagrammatically illustrates time-maximum pump torque characteristics and time-engine revolution characteristics available in the first embodiment of the present invention.

In FIG. 12, numeral 50 indicates a time at which the control device 5 has been operated from a state in which the control device 5 was in a non-operated state and the maximum pump torque was held at the low pump torque, i.e., the minimum pump torque, in other words, an operation start time point. Numeral 51 indicates a time at which the predetermined holding time TX2 has elapsed, i.e., a time point of a lapse of the holding time. Further, numeral 52 in FIG. 12(*b*) indicates target engine revolutions, and numeral 58 in FIG. 12(*a*) indicates a maximum pump torque T of a value Max corresponding to the target engine revolutions.

With a system not equipped with the third torque control means as the characteristic feature of the first embodiment, in other words, with a system that simply performs only speed sensing control, control is performed to instantaneously increase the pump torque to the maximum pump torque corresponding to the target engine revolutions when the predetermined holding time TX3 has elapsed, as indicated by conventional engine revolutions 53 in FIG. 12(*b*). Therefore, a small but relatively large engine lag down occurs subsequent to a lapse of the predetermined holding time TX2. As a result of speed sensing control for the engine lag down, a time is actually needed until the pump torque increases to the maximum pump torque T of the value Max, as indicated by a conventional controlled torque 54 in FIG. 12(*a*), although the time is short. Further, the pump torque has a relatively small value as indicated by the controlled torque 54. As a consequence, the work performance and operability tend to deteriorate.

This first embodiment gradually increases the pump torque at the torque increment rate K (K=K1) by the third torque control means as mentioned above. Pump torque control is performed to give an actual pump torque 55 shown in FIG. 12(*a*), which is a characteristic curve having a gradient. As a result, the load applied to the engine 1 subsequent to the lapse of the predetermined holding time TX2 becomes relatively small, and as indicated by engine revolutions 56 in FIG. 12(*b*), an engine lag down is controlled small compared with that occurring when only the general speed sensing control is relied upon. By the speed sensing control at the engine revolutions 56, it is actually possible to reach the value Max of the maximum pump torque T earlier than the conventional controlled torque 54 as indicated by controlled torque 57 in FIG. 12(*a*). In addition, a pump torque of relatively large value can be obtained.

When the revolution deviation ΔN determined at the subtraction unit 40 of the speed sensing control means is ΔN2 which his slightly greater than the above-described ΔN1 as shown in FIG. 10, the speed sensing torque ΔT to be determined at the corrected torque computing unit 42 becomes ΔT2 which is greater than the above-described ΔT1 as shown in FIG. 10. From the relation of FIG. 11, the torque increment rate K at this time, therefore, becomes K2 which is greater than the above-described K1.

In this case, the gradient of the characteristic curve becomes greater than the above-described actual pump torque 55 as indicated by an actual pump torque 59 in FIG. 12(*a*). As a result, the engine lag down is controlled still smaller than that obtained by the above-described control as indicated by engine revolutions 60 in FIG. 12(*b*). By speed sensing control for the engine lag down, it is actually possible to reach the value Max of the maximum pump torque T still earlier as indicated by a controlled torque 60*a* in FIG. 12(*a*). In addition, a pump torque of still greater value can be obtained.

According to the first embodiment as described above, the torque increment rate K is held constant at K1 or K2 by the third torque control means subsequent to a lapse of the predetermined holding time TX2, during which the maximum pump torque is held at the low pump torque, i.e., the minimum pump torque (value: Min), when the control device 5 is operated from a non-operated state, and then, the pump torque is gradually increased as time goes on. The engine lag down subsequent to the lapse of the predetermined holding time TX2 can, therefore, be controlled small compared with that occurring when only the general speed sensing control is performed. As a result, it is possible to shorten the time until the maximum pump torque T of the value Max corresponding to the target revolutions Nr is reached. Further, a large pump torque can be assured in an early stage subsequent to the lapse of the predetermined holding time TX2. Owing to these, the work performance and operability can be improved.

Figure 13A:
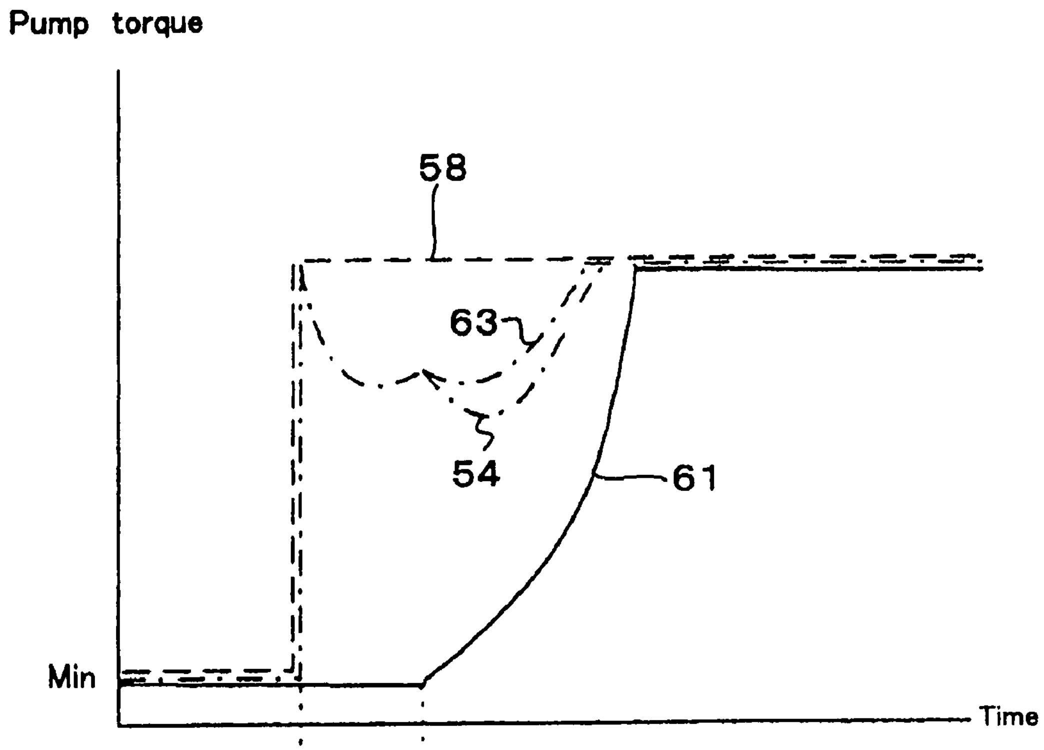
FIG. 13 is a diagram showing time-maximum pump torque characteristics and time-engine revolutions characteristics, which are available from a second embodiment of the present invention.
Figure 13B:
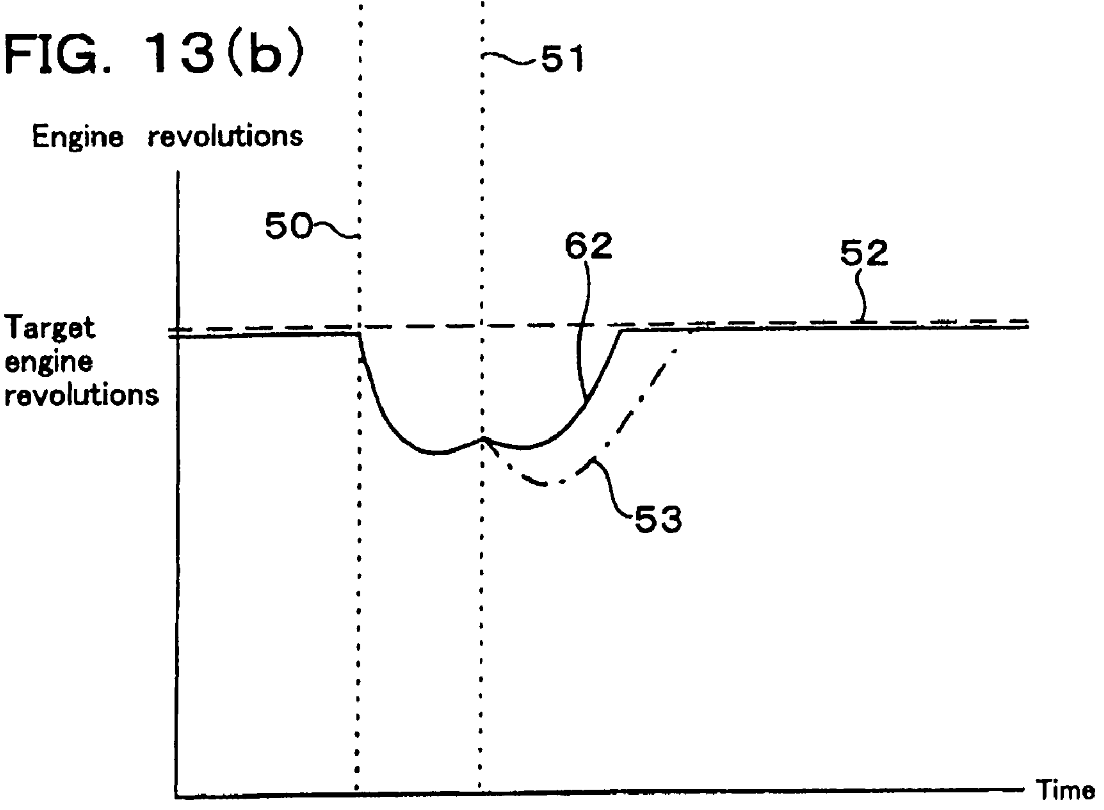

FIG. 13 diagrammatically illustrates time-maximum pump torque characteristics and time-engine revolution characteristics available from the second embodiment of the present invention.

In this second embodiment, the machinery body controller 13 which makes up the third torque control means is equipped with a means for performing the following computation in step S5 of the above-described FIG. 9.

$$T=K/(\text{time})^2+\text{Min} \quad (3)$$

Following the flow chart of FIG. 9 performed by the machinery body controller 13, a description will be made. When the holding time TX from the operation of the control device 5 from the non-operated state is determined to have reached the predetermined holding time TX2 in step S1 of FIG. 9, the routine advances to step S2 of FIG. 9, in which at the subtraction unit 40 of FIG. 8 included in the speed sensing control means, the revolution deviation ΔN of the actual revolutions Ne from the target revolutions Nr is determined. Now assume that ΔN obtained at this time is ΔN1 shown in FIG. 10.

The routine next advances to step S3 of FIG. 9, and at the corrected torque computing unit 42 of FIG. 8 included in the speed sensing control means, a speed sensing torque ΔT corresponding to the revolution deviation ΔN (=ΔN1) is determined. At this time, ΔT is determined to be ΔT1 from the relation of FIG. 10.

The routine next advances to step S4 of FIG. 9, and from the relation shown in FIG. 11, a torque increment rate K corresponding to ΔT1 is determined to be K1.

The routine next advances to step S4 of FIG. 9, and from the above-described formula (3) which is a characteristic feature of this second embodiment, a computation of:

$$T=K1/(\text{time})^2+\text{Min} \quad (4)$$

is performed, and a control signal corresponding to the target value T is outputted from the machinery body controller 13 to the control portion of the solenoid valve 16. It is to be note that as mentioned above, "time" means a time subsequent to the lapse of the predetermined holding time TX2 and "Min" means the value of a minimum pump torque to be held during the predetermined holding time TX2.

In this second embodiment, the torque increment rate K is also controlled at K1, in other words, constant as indicated by the formula (4).

According to this second embodiment, by the machinery body controller 13 which makes up the third torque control means in which a computing means is included to perform the computation of the formula (4), pump torque control is performed to obtain an actual pump torque 61 shown in FIG. 13(*a*), which is a characteristic curve forming a curve that the pump torque gradually increases by relying upon the torque increment rate K (=K1). As a result, as in the above-described first embodiment, the engine lag down is controlled relatively small as indicated by engine revolutions 62 in FIG. 13(*b*). By speed sensing control for the engine lag down, a maximum pump torque corresponding to the target revolutions of the engine 1 can actually be reached earlier compared with the conventional controlled torque 54 as indicated by a controlled torque 63 in FIG. 13(*a*). In addition, a relatively large pump torque can be also assured in an early stage subsequent to the lapse of the predetermined holding time TX2.

As the second embodiment constructed as described above is also designed to control the solenoid valve 16 such that the pump torque is gradually increased subsequent to a lapse of the predetermined holding time TX2, the second embodiment can bring about similar advantageous effects as those available from the above-described first embodiment.

Figure 14A:
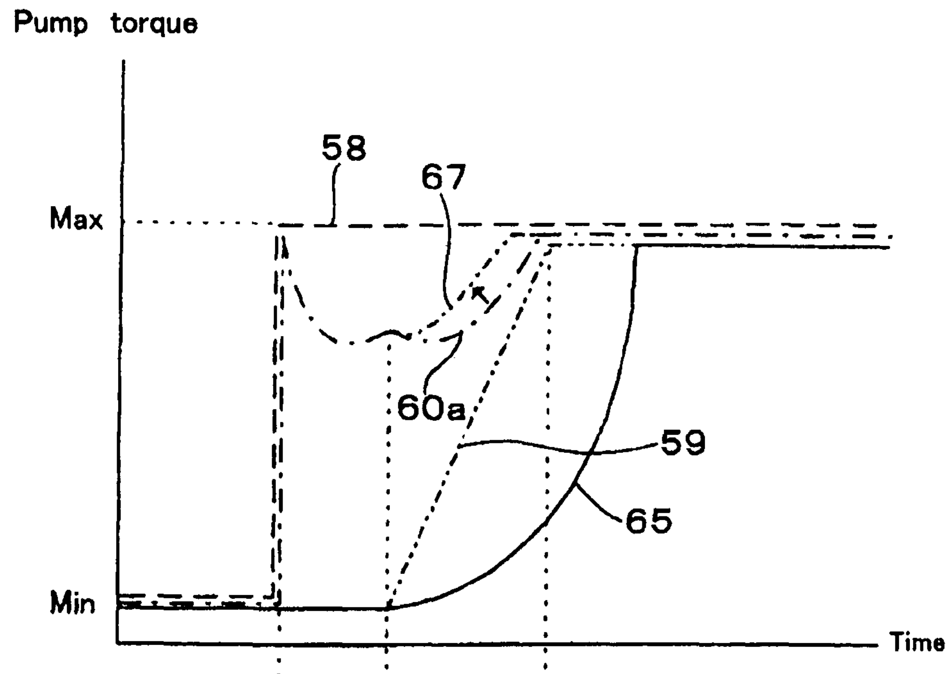
FIG. 14 is a diagram showing time-maximum pump torque characteristics and time-engine revolutions characteristics, which are available from a third embodiment of the present invention.
Figure 14B:
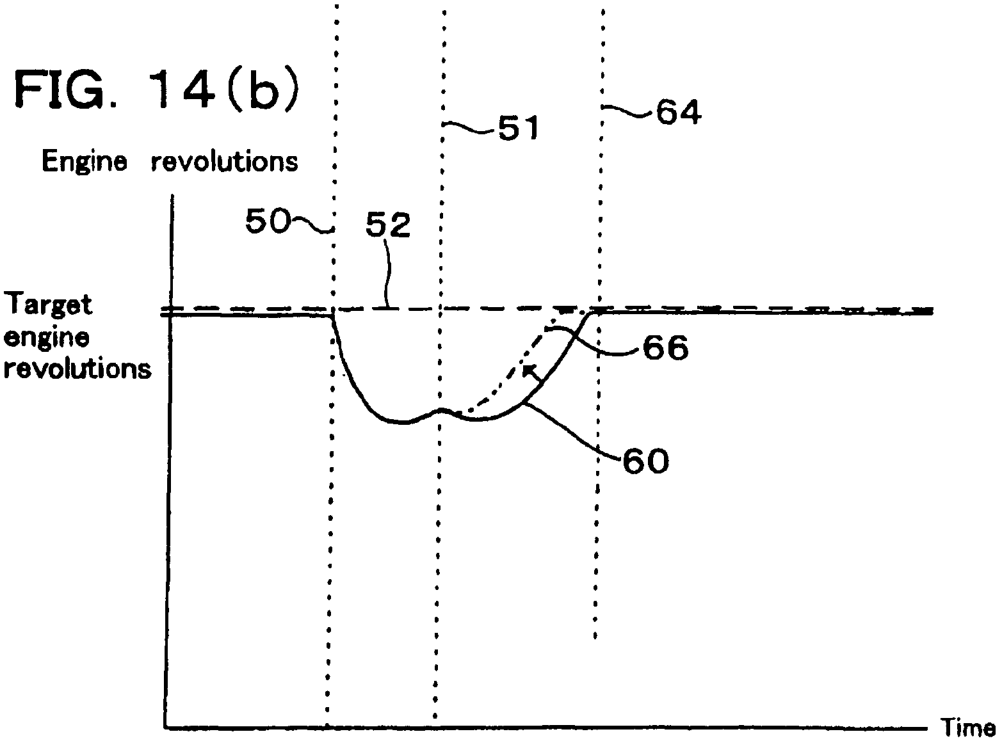

FIG. 14 diagrammatically illustrates time-maximum pump torque characteristics and time-engine revolution characteristics available from the third embodiment of the present invention.

In this third embodiment, the machinery body controller 13 which makes up the third torque control means is equipped with a means for variably controlling the torque increment rate K during a change from the predetermined low pump torque, in other words, the minimum pump torque (value: Min) to the maximum pump torque (value: Max) corresponding to the target revolutions Nr of the engine 1 subsequent to a lapse of the predetermined holding time TX2.

This means for variably controlling the torque increment rate K includes a means for sequentially computing the torque increment rate K for every unit time, for example, subsequent to the lapse of the predetermined holding time TX2.

In the third embodiment, the above-described processings of steps S2 to S5 in FIG. 9 are performed in every unit time, in other words, are repeatedly performed, and a control signal corresponding to a target value T of the maximum pump torque available in each unit time is outputted from the machinery body controller 13 to the control portion of the solenoid valve 16.

According to the third embodiment constructed as described above, the torque increment rate K becomes a value that varies depending on the revolution deviation ΔN of the engine 1. By performing pump torque control to achieve an actual pump torque 65 shown in FIG. 14(*a*) which is a characteristic curve forming a curve that the pump torque gradually increases relying upon the variable torque increment rate K, it is possible to obtain engine revolutions 66 at which an engine lag down is controlled still smaller, for example, compared with the engine revolutions 60 of FIG. 14(*b*) available from the above-described first embodiment. By speed sensing control at the engine revolutions 66, it is actually possible to obtain a controlled torque 67 having still higher accuracy than the above-described control torque 60*a* in FIG. 14 available from the first embodiment. In other words, according to this third embodiment, work performance and operability of still higher accuracy than those available from the first embodiment are assured. It is to be noted that numeral 64 in FIG. 14 indicates a time at which the number of engine revolutions has reached a target number of revolutions, namely, a return end time point.

Figure 15:
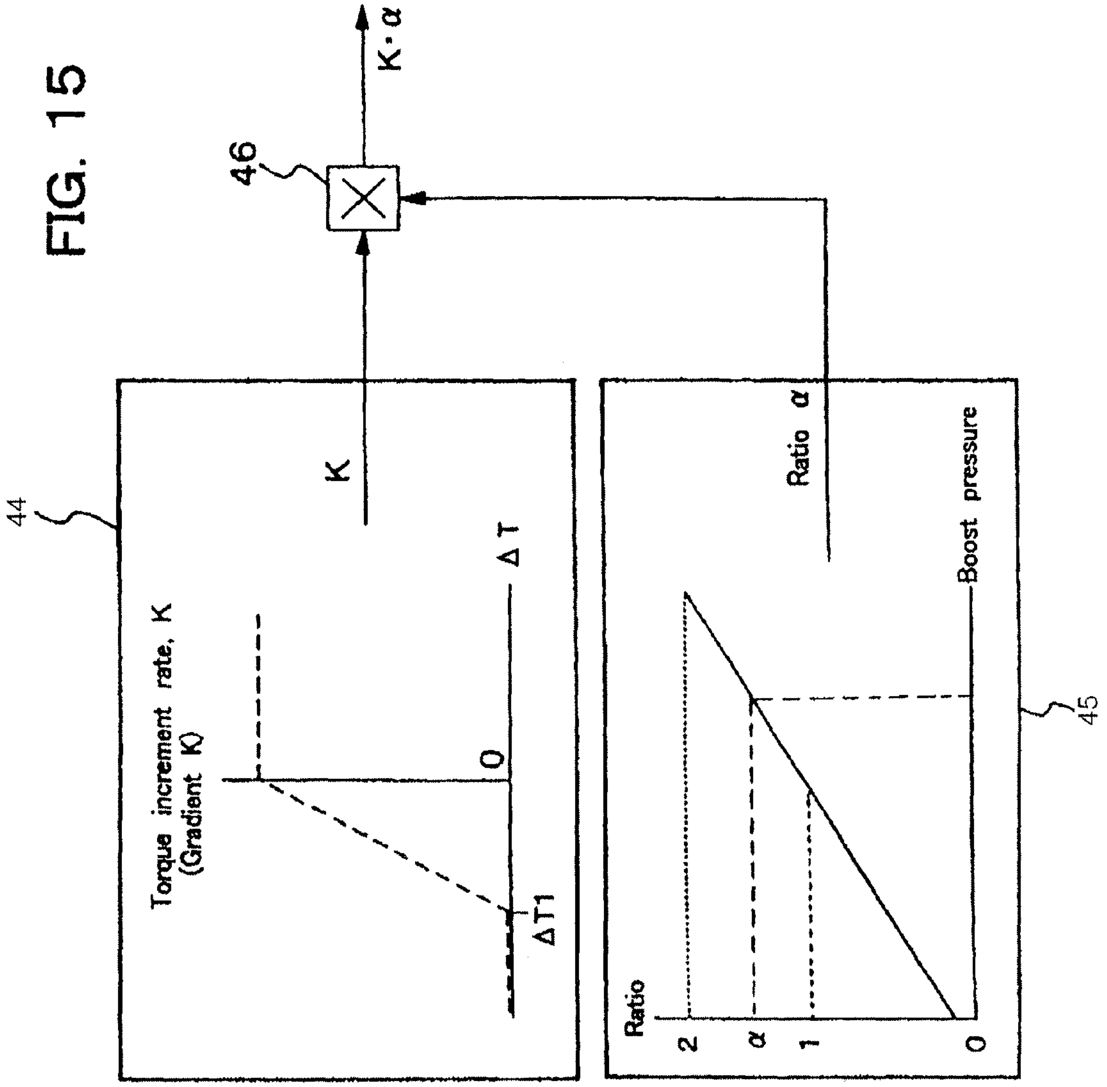
FIG. 15 is a diagram illustrating essential elements of a fourth embodiment of the present invention.
Figure 16A:
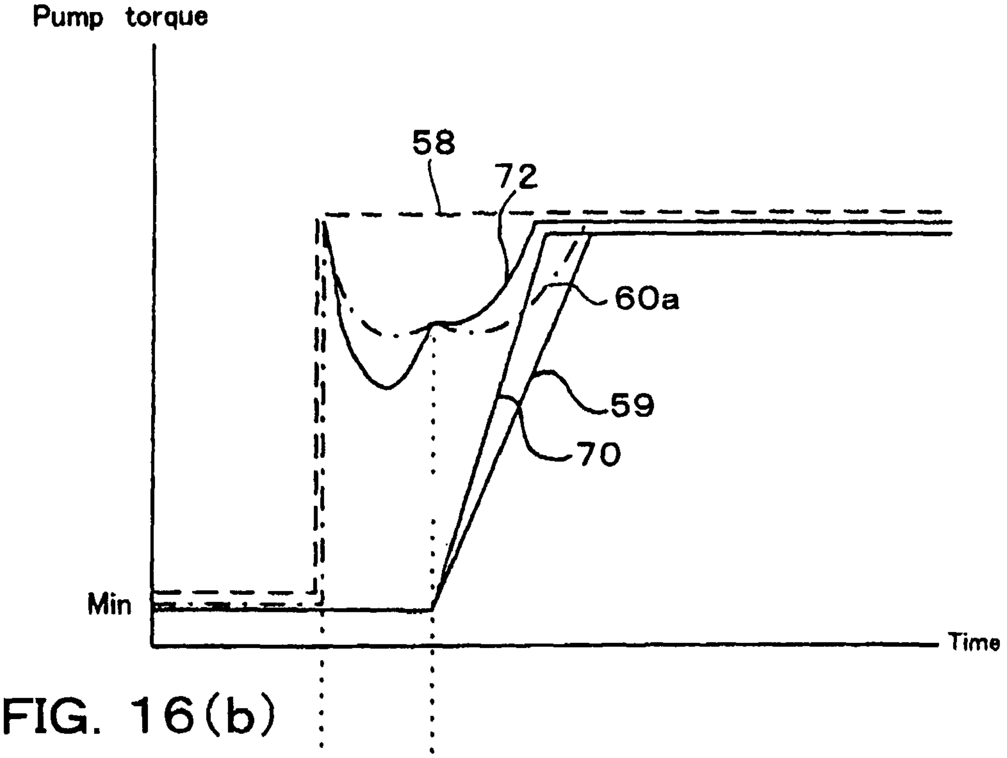
FIG. 16 is a diagram showing time-maximum pump torque characteristics and time-engine revolutions characteristics, which are available from a fourth embodiment of the present invention.
Figure 16B:
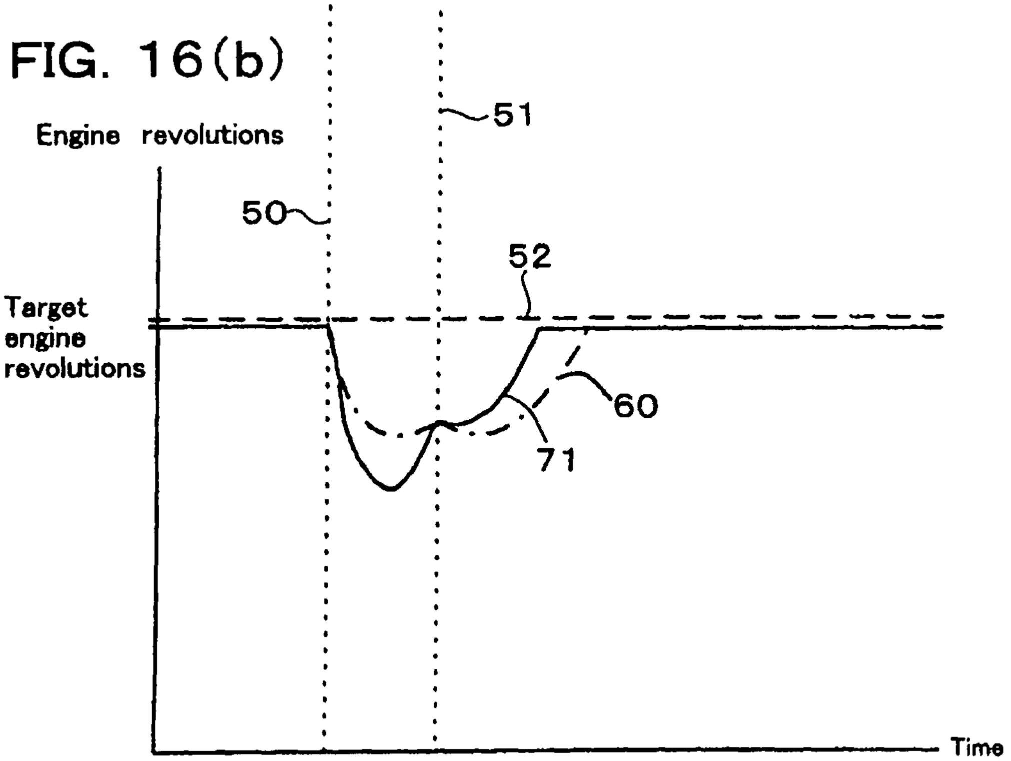

FIG. 15 diagrammatically illustrates essential elements of the fourth embodiment of the present invention, and FIG. 16 diagrammatically shows time-maximum pump torque characteristics and time-engine revolution characteristics available from the fourth embodiment.

In this fourth embodiment, the third torque control means included in the machinery body controller 13 is equipped with a function setting unit 44, a computing unit 45, and a multiplication unit 46. The function setting unit 44 sets a relation between speed sensing torques ΔT and torque increment rates K, the computing unit 45 computes a ratio relating to a boost pressure, that is, a ratio α corresponding to a boost pressure sensor 17 shown in FIG. 1, and the multiplication unit 46 multiplies the increment torque K outputted form the function setting unit 44 with the ratio α outputted from the computing unit 45.

In this fourth embodiment, the machinery body controller 13 which makes up the third torque control means is equipped with a means for performing the following computation in the above-described step S5 in FIG. 9.

$$T=(K\cdot\alpha\times\text{time})+\text{Min} \quad (5)$$

Where α is the ratio determined at the above-described multiplication unit 46.

Now assume, for example, that in the fourth embodiment constructed as described above, the revolution deviation ΔN of the engine 1 is ΔN2 shown in FIG. 10, the speed sensing torque ΔT is ΔT2 shown in FIG. 10, the toque increment rate K is K2 shown in FIG. 11, and the ratio α corresponding to the boost pressure detected by the boost pressure sensor 17 is a value in a range of $1<\alpha<2$. As a result of the above-described processings S2 to S5 in FIG. 9, a control signal corresponding to a target value T of the maximum pump torque as determined by the formula (5) is outputted from the machinery body controller 13 to the control portion of the solenoid valve 16.

Namely, by performing pump torque control such to obtain an actual pump torque 70 shown in FIG. 16(*a*) which is a characteristic curve that the pump torque gradually and linearly increases relying upon the toque increment rate $K\cdot\alpha(>K)$, in other words, the actual pump torque 70 forming a straight line of a greater gradient than the characteristic curve of the actual pump torque 59 in the first embodiment, it is possible to achieve engine revolutions 71 at which an engine lag down is controlled still smaller than the engine revolutions 60 of FIG. 16(*b*) available from the first embodiment. By the speed sensing control at the engine revolutions 71, it is actually possible to obtain a control torque 72 of still higher accuracy than a control torque 60*a* in FIG. 16(*a*) available from the above-described first embodiment. Namely, with this fourth embodiment, work performance and operability of higher accuracy than those available from the first embodiment are assured.

The invention claimed is:

1. An engine lag down control system for construction machinery provided with an engine, a main pump driven by said engine, a torque regulating means for regulating a maximum pump torque of said main pump, a hydraulic actuator driven by pressure fluid delivered from said main pump, and a control device for controlling said hydraulic actuator, said engine lag down control system comprising:

a first torque control means for controlling said torque regulating means to a predetermined low pump torque lower than the maximum pump torque when a non-operated state of said control device has continued beyond a predetermined monitoring time, and a second torque control means for controlling said torque regulating means to the predetermined low pump torque or to a pump torque around of the predetermined low pump torque for a predetermined holding time subsequent to an operation of said control device from the non-operated state while said torque regulating means is being controlled by said first torque control means, to control small a temporary reduction in engine revolutions that occurs upon operation of said control device from the non-operated state, wherein:

said engine lag down control system is provided with a third torque control means for controlling said torque regulating means such that from a time point of a lapse of the predetermined holding time, the pump torque of said main pump gradually increases at a predetermined torque increment rate as time goes on, and further wherein:

said engine lag down control system is provided with a speed sensing control means having a torque correction computing unit, which determines a torque correction value corresponding to a revolution deviation of an actual number of revolutions of said engine from a target number of revolutions of said engine, for determining a target value for the maximum pump torque, which is controlled by said first torque control means, on a basis of the torque correction value determined by said torque correction computing unit, and said predetermined torque increment rate is determined on the basis of said torque correction value.

2. The invention as described in claim 1, wherein said third torque control means comprises a means for controlling the torque increment rate to be held constant during a change from the predetermined low pump torque to a maximum pump torque corresponding to a target number of revolutions of said engine.

3. The invention as described in claim 1, wherein said third torque control means comprises a means for variably controlling the torque increment rate during a change from the predetermined low pump torque to a maximum pump torque corresponding to a target number of revolutions of said engine.

4. The invention as described in claim 3, wherein said means for variably controlling the torque increment rate comprises a means for sequentially computing the torque increment rate for every unit time.

5. The invention as described in claim 1, wherein:

said third torque control means comprises a function setting unit for setting beforehand a functional relation between torque correction values and torque increment rates, and a means for computing a torque increment rate from the torque correction value determined by said torque correction computing unit of said speed sensing control means and the functional relation set by said function setting unit.

6. The invention as described in claim 5, wherein:

said engine lag down control system is provided with a boost pressure sensor for detecting a boost pressure, and said third torque control means comprises a torque increment rate correction means for correcting the torque increment rate in accordance with the boost pressure detected by said boost pressure sensor.

* * * * *